United States Patent
Itakura

(10) Patent No.: US 8,548,205 B2
(45) Date of Patent: Oct. 1, 2013

(54) IMAGE PROCESSING DEVICE, AND RECORDING MEDIUM STORING IMAGE PROCESSING PROGRAM

(75) Inventor: Jun Itakura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 251 days.

(21) Appl. No.: 13/073,710

(22) Filed: Mar. 28, 2011

(65) Prior Publication Data

US 2011/0293199 A1    Dec. 1, 2011

(30) Foreign Application Priority Data

May 31, 2010    (JP) ................................. 2010-124640

(51) Int. Cl.
*G06K 9/00*    (2006.01)
*G01C 21/00*    (2006.01)

(52) U.S. Cl.
USPC ........................... 382/113; 382/175; 701/516

(58) Field of Classification Search
USPC ................. 382/100–103, 106–107, 112–115, 382/140, 155, 162, 168, 173, 175, 181, 189, 382/232, 254, 274, 276, 286–291, 295, 305, 382/312; 701/532, 516; 340/995.27; 358/1.15; 327/536
See application file for complete search history.

(56) References Cited

U.S. PATENT DOCUMENTS 5,519,392 A * 5/1996 Oder et al. ............... 340/995.27
5,774,362 A * 6/1998 Suzuki et al. ................. 701/532
2009/0214082 A1 * 8/2009 Hoshi ........................... 382/106
2009/0237712 A1 * 9/2009 Shirai .......................... 358/1.15
2009/0256626 A1 * 10/2009 Hsieh et al. .................... 327/536
2009/0265626 A1 10/2009 Suga
2009/0310167 A1 12/2009 Sugimoto (Continued)

FOREIGN PATENT DOCUMENTS

CN    1201184 A    12/1998
CN    101005556 A    7/2007

(Continued)

OTHER PUBLICATIONS

Seiko Epson Corp., "'Using the preview window' of Index.htm included in Epson Web-To-Page Utility v1.1aA," Feb. 1, 2007, available at http://www.epson.jp/dl_soft/readme/5411.htm, Sep. 2, 2010. (Partial translation enclosed.).

(Continued)

*Primary Examiner* — Seyed Azarian
(74) *Attorney, Agent, or Firm* — Baker Botts L.L.P.

(57) ABSTRACT

An image processing device connected with an image formation device configured to output image on a recording medium, includes a data obtaining unit configured to obtain map image data representing a basic map image showing a user-designated geographic area at a user-designated scale, an area identifying unit configured to identify a basic image formation area and a surplus area, the basic map image being formed on the basic image formation area, the surplus area being an area within the image forming area but the basic map image is not formed. The image processing device further includes an additional data obtaining unit configured to obtain map image data necessary for covering an enlarged image formation area including the basic image formation area and at least part of the surplus area, from the map image data provider. The map image can be formed based on the updated map image data.

39 Claims, 7 Drawing Sheets

(56) References Cited

U.S. PATENT DOCUMENTS

| | | | |
|---|---|---|---|
| 2010/0103460 | A1 | 4/2010 | Murayama et al. |
| 2010/0131903 | A1 | 5/2010 | Thomson et al. |
| 2011/0242600 | A1 | 10/2011 | Yanagawa |
| 2011/0242601 | A1 | 10/2011 | Takahashi |

FOREIGN PATENT DOCUMENTS

| | | |
|---|---|---|
| JP | 2003-008866 A | 1/2003 |
| JP | 2009-216842 A | 9/2009 |
| JP | 2009-258966 A | 11/2009 |
| JP | 2009-302916 A | 12/2009 |
| JP | 2011-215738 A | 10/2011 |
| JP | 2011-215739 A | 10/2011 |

OTHER PUBLICATIONS

Canon Corp., "'Preview Screen' of top.htm included in ewpx-win-1_2_1-ea23.exe," available at http://cweb.canon.jp/pixus/pdf/index/nikkeipc.pdf (searched on Jan. 27, 2010). (Partial translation enclosed.).

Canon Information Systems Research Australia PTY. Ltd., "'Easy-WebPrint: Key Features' of product info window," available at http://www.canoneasywebprint.com/jp/, 2007 (searched on Jan. 27, 2010).

Hewlett-Packard Development Co., L.P., "'Automatic fixes:' Enhanced preview and print capabilities of hpsmartprint.chm included in HP_Smart_Web_Print_v4.6.exe," Mar. 2009, available at http://h10025.www1.hp.com/ewfrf/wc/document?lc=ja&dlc=ja&cc=jp&docname=c01418497 (searched on Jan. 27, 2010). (Partial translation enclosed.).

United States Patent and Trademark Office, Office Action for U.S. Appl. No. 13/076,072 (related U.S. patent application), mailed Mar. 7, 2013.

Seiko Epson Corp., "'Using the preview window' of Index.htm included in Epson Web-To-Page Utility v1.1aA," Feb. 1, 2007, available at http://www.epson.jp/dl_soft/readme/5411.htm, Sep. 2, 2010. (Partial translation enclosed.).

Canon Corp., "'Preview Screen' of top.htm included in ewpx-win-1_2_1-ea23.exe," available at http://cweb.canon.jp/pixus/pdf/index/nikkeipc.pdf (searched on Jan. 27, 2010). (Partial translation enclosed.).

Canon Information Systems Research Australia Pty. Ltd., "'Easy-WebPrint: Key Features' of product info window," available at http://www.canoneasywebprint.com/jp/, 2007 (searched on Jan. 27, 2010).

Hewlett-Packard Development Co., L.P., "'Automatic fixes:' Enhanced preview and print capabilities of hpsmartprint.chm included in HP_Smart_Web_Print_v4.6.exe," Mar. 2009, available at http://h10025.www1.hp.com/ewfrf/wc/document?lc=ja&dlc=ja&cc=jp&docname=c01418497 (searched on Jan. 27, 2010). (Partial translation enclosed.).

United States Patent and Trademark Office, Non-Final Office Action for U.S. Appl. No. 13/076,072 (related U.S. patent application), mailed Oct. 26, 2012.

Japan Patent Office, Notification of Reasons for Rejection for Japanese Patent Application No. 2010-124640 (related to above-captioned patent application), mailed May 14, 2013.

State Intellectual Property Office of the People'S Republic of China, Notification of First Office Action for Chinese Patent Application No. 201110085089.2 (counterpart to above-captioned patent application), mailed Jun. 28, 2013.

United States Patent and Trademark Office, Non Final Rejection for U.S. Appl. No. 13/850,928 (related to above-captioned patent application), mailed Jul. 16, 2013.

\* cited by examiner

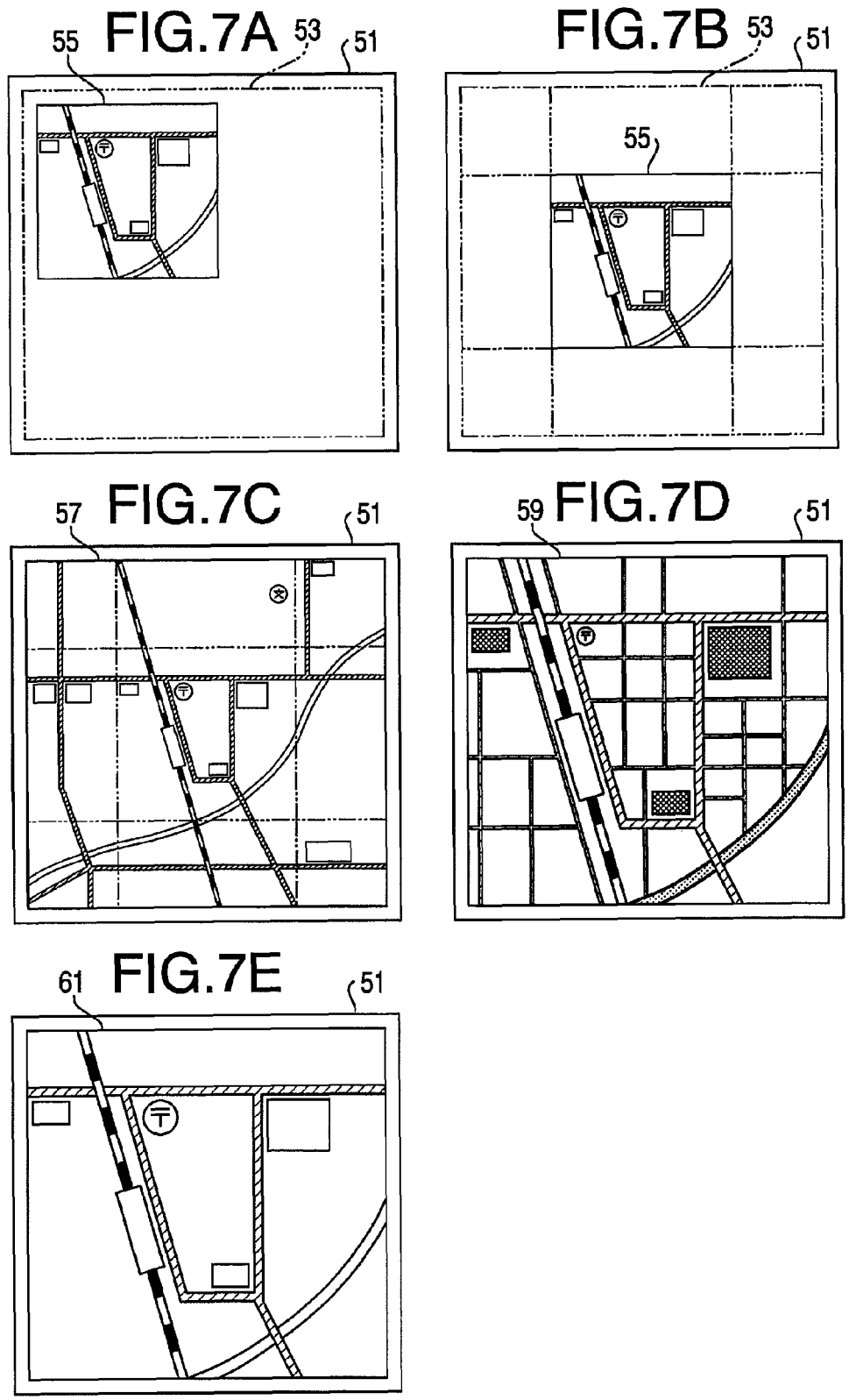

IMAGE PROCESSING DEVICE, AND RECORDING MEDIUM STORING IMAGE PROCESSING PROGRAM

CROSS-REFERENCE TO RELATED APPLICATION

This application claims priority under 35 U.S.C. §119 from Japanese Patent Application No. 2010-124640 filed on May 31, 2010. The entire subject matter of the application is incorporated herein by reference.

BACKGROUND

1. Technical Field

Aspects of the present invention relate to an image processing device which makes an image formation device form an image of a map, and a recording medium storing an image processing program which, when executed by a computer, causes the computer to function as such an image processing device.

2. Related Art

Conventionally, there have been suggested techniques of displaying a print pre-view image so that a user can review and confirm the contents of an image to be printed on a printing sheet before it is actually printed when, for example, the user intends to print a web page. Making use of such a technique, the user can have a desired printout of the image.

SUMMARY

Recently, various web sites provides map applications. The map application is typically configured such that, when a user can designate a geographic position using a web browser, a map of a predetermined area around the designate geographic position is displayed in a map display area of the browser. To the displayed map, generally, the user can apply predetermined operations such as scrolling of the map, changing of the scale, and printing of the displayed map.

When the map displayed by the map application is printed, unnecessary margins may be formed around the map and/or unnecessary information (e.g., advertisement, operational guide, etc.) when the map is printed.

Due to such unnecessary margins and/or unnecessary information, an area for printing the map is reduced. Therefore, for the same scale, the smaller the print area is, the smaller geographical area the map shows.

If the scale of the map is decreased, it is possible to widen the geographical area the map shows even though the print area is smaller. However, in such a case, detail information on the map is lost. For example, narrow alleyways may be omitted from the map printed at the decreased scale.

Aspects of the invention provides an improved image processing device with which the unnecessary margins and/or information can be avoided when a map is printed using the map application so that a map containing more information can be printed. Aspects of the invention also provides a recording medium storing a program which causes a computer to function the image processing device as above.

According to aspects of the invention, there is provided an image processing device connected with an image formation device configured to output image on a recording medium. The image processing device is provided with a data obtaining unit configured to obtain map image data from a map image data provider, the map image data representing a basic map image showing a geographic area, an area identifying unit configured to identify a basic image formation area and a surplus area, the basic image formation area and the surplus area being an area within an image forming area on the recording medium, the basic map image being formed on the basic image formation area, the surplus area being an area within the image forming area but the basic map image is not formed, an additional data obtaining unit configured to obtain map image data necessary for covering an enlarged image formation area, which is an area including the basic image formation area and at least part of the surplus area, from the map image data provider, and a controlling unit configured to control the image formation device to output the enlarged map image on the recording medium based on the map image data additionally obtained from the map image data provider.

According to aspects of the invention, there is also provided a non-transitory recording medium storing an image processing program including instructions to be executed by a computer, the computer being connected with an image formation device configured to output image on a recording medium, the instructions causing the computer to function as the image processing device described above.

According to aspects of the invention, there is provided an image processing method for a computer which is connected with an image formation device configured to output image on a recording medium. The method includes steps of obtaining map image data from a map image data provider, the map image data representing a basic map image showing a geographic area, identifying a basic image formation area and a surplus area, the basic image formation area and the surplus area being an area within an image forming area on the recording medium, the basic map image being formed on the basic image formation area, the surplus area being an area within the image forming area but the basic map image is not formed, obtaining additional map image data necessary for covering an enlarged image formation area, which is an area including the basic image formation area and at least part of the surplus area, from the map image data provider, and controlling the image formation device to output the enlarged map image on the recording medium based on the map image data additionally obtained from the map image data provider.

BRIEF DESCRIPTION OF THE ACCOMPANYING DRAWINGS

FIGS. 7A-7E show examples of printed maps.

DETAILED DESCRIPTION

Hereinafter, an exemplary embodiment according to aspects of the present invention will be described with reference to the accompany drawings.

Figure 1:
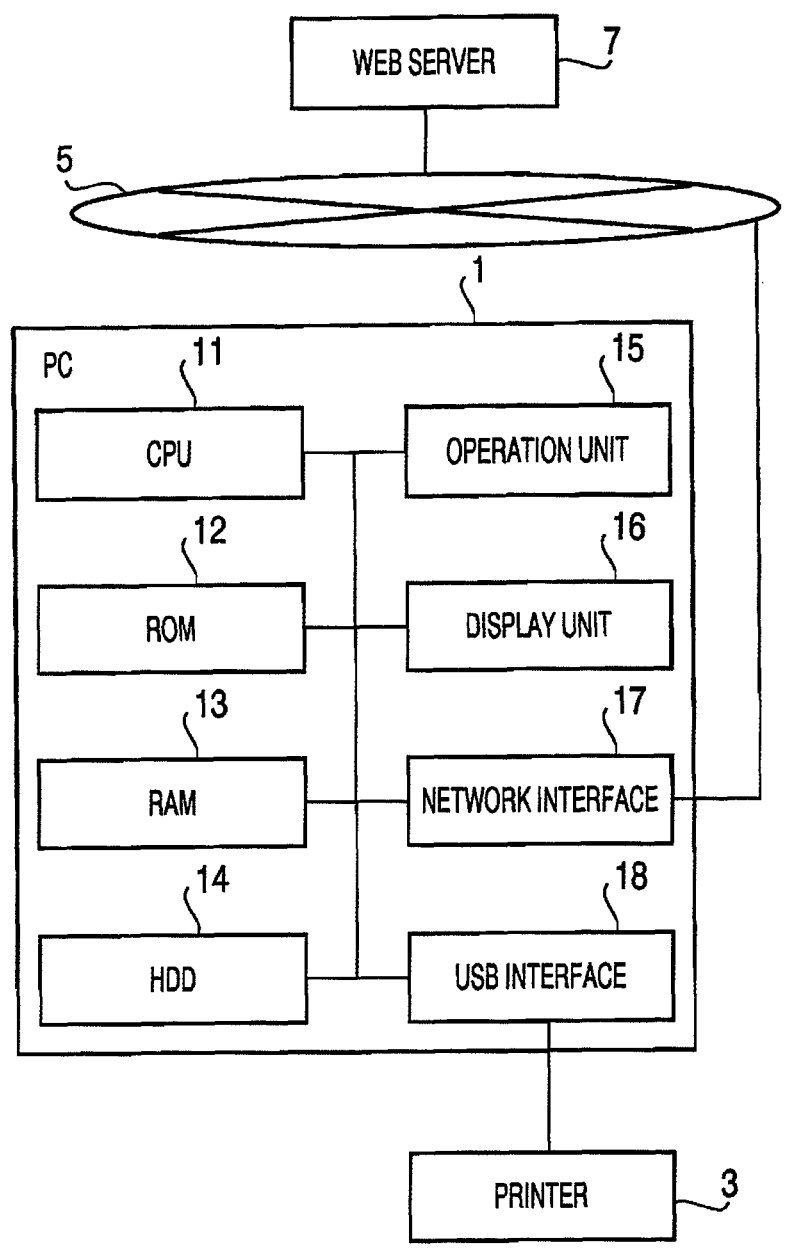
FIG. 1 is a block diagram showing an entire system containing a PC (personal computer) and a printer, according to an embodiment of the invention.

A printing system according to an embodiment of the invention includes, as shown in FIG. 1, a PC (personal computer) 1 and a printer 3 connected to the PC 1. The PC 1 is configured to be able to communicate with a web server 7 through a WAN (wide area network) 5. An example of the WAN 5 is the Internet.

The PC 1 is provided with a CPU (central processing unit) 11, a ROM (read only memory) 12, a RAM (random access memory) 13, an HDD (hard disk drive) 14, an operation unit 15, a display unit 16, a network interface 17, and a USB (universal serial bus) interface 18.

On the HDD 14, various types of software including an OS (operating system) are stored. A web browser (described later), plug-ins, and data such as scripts called by the plug-ins are also stored on the HDD 14. When each of the programs is executed by the CPU 11, the program is retrieved from the HDD 14 and developed in the RAM 13.

The operation unit 15 has a keyboard and pointing devices (e.g., a mouse). The display unit 16 has an LCD (liquid crystal display).

A user of the PC 1 can operate the operation unit 15 to activate the web browser. When activated, the web browser is capable of requesting the web server 7 for data in accordance with the operation of the user.

The web server 7 is configured to transmit web page data including map image data to the PC 1 in response to a request from the PC 1. The web page data may be markup document data using HTML (hypertext markup language), or XHTML (extensible HTML). When the web page data is transmitted from the web server 7, the PC 1 receives the web page data and displays the web page including the map image on the display unit 16.

After the web page including a map image is displayed on the display unit 16, when the user operates the operation unit 15, scrolling of the map image, changing of the scale of the map, etc. are executed in response to the user operation.

Specifically, when the user operation is inputted, the PC 1 transmits data corresponding to the user operation to the web server 7 using an asynchronous communication technique (e.g., Ajax) implemented to the web browser, in parallel with acquisition of the user operation. The web server 7, which has received the data from the PC 1, returns image data of the map corresponding to the user operation. Then, the PC 1 receives the image data from the web server 7, and dynamically updates the image displayed on the display unit 16. With the above configuration, scrolling or scale changing of the map image is performed in response to the user operation.

If the user operates the operation unit 15 to input a print command to print the web page containing the map, the PC 1 controls the printer 3 to print out the web page.

Hereinafter, processes executed by the PC 1 will be described in detail. The web browser executed by the PC 1 is configured such that, by installing plug-ins, various extended functions can be implemented in addition to the standard functions.

Figure 2:
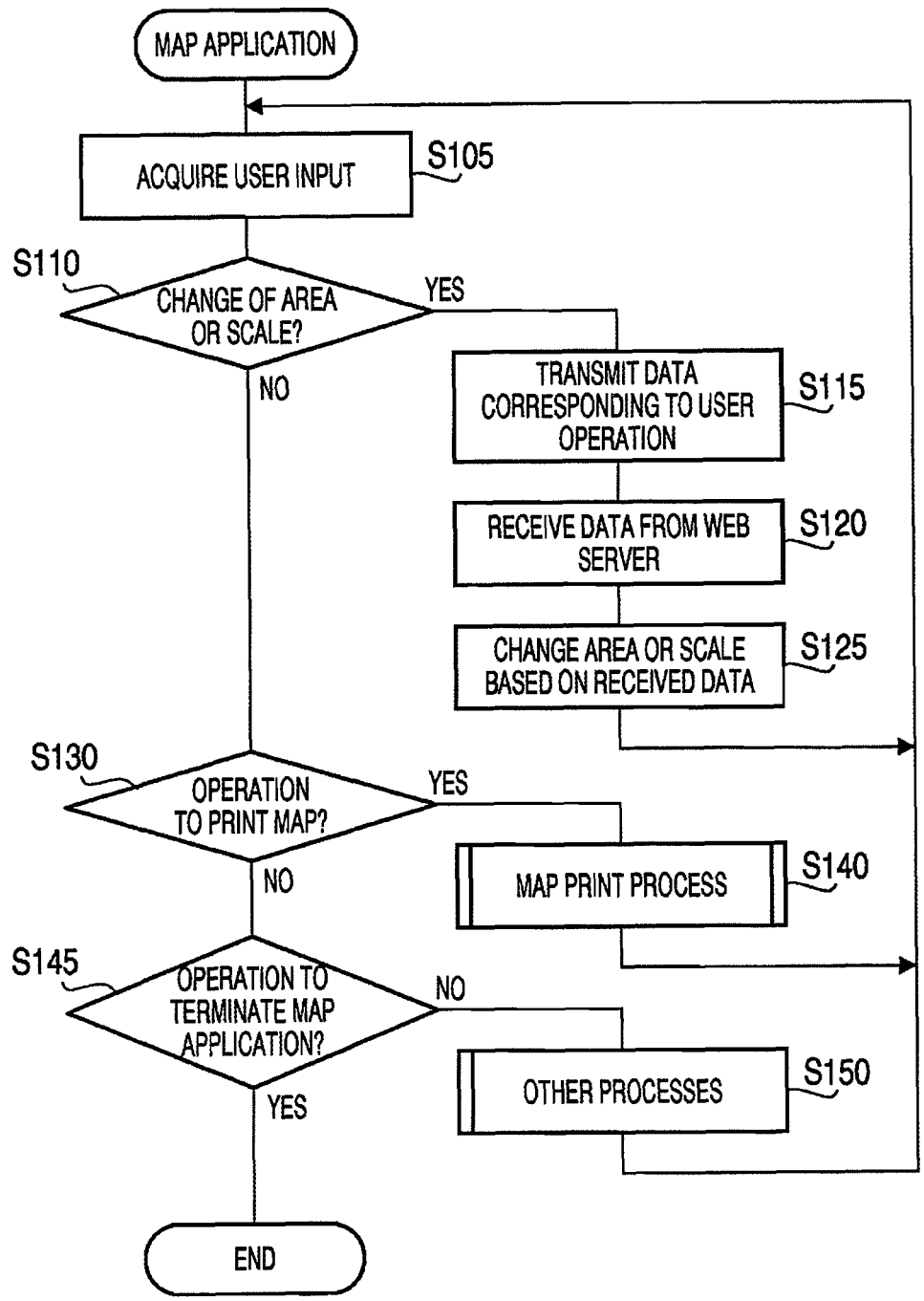
FIG. 2 is a flowchart illustrating a main process of a map application executed by the PC.
Figure 3:
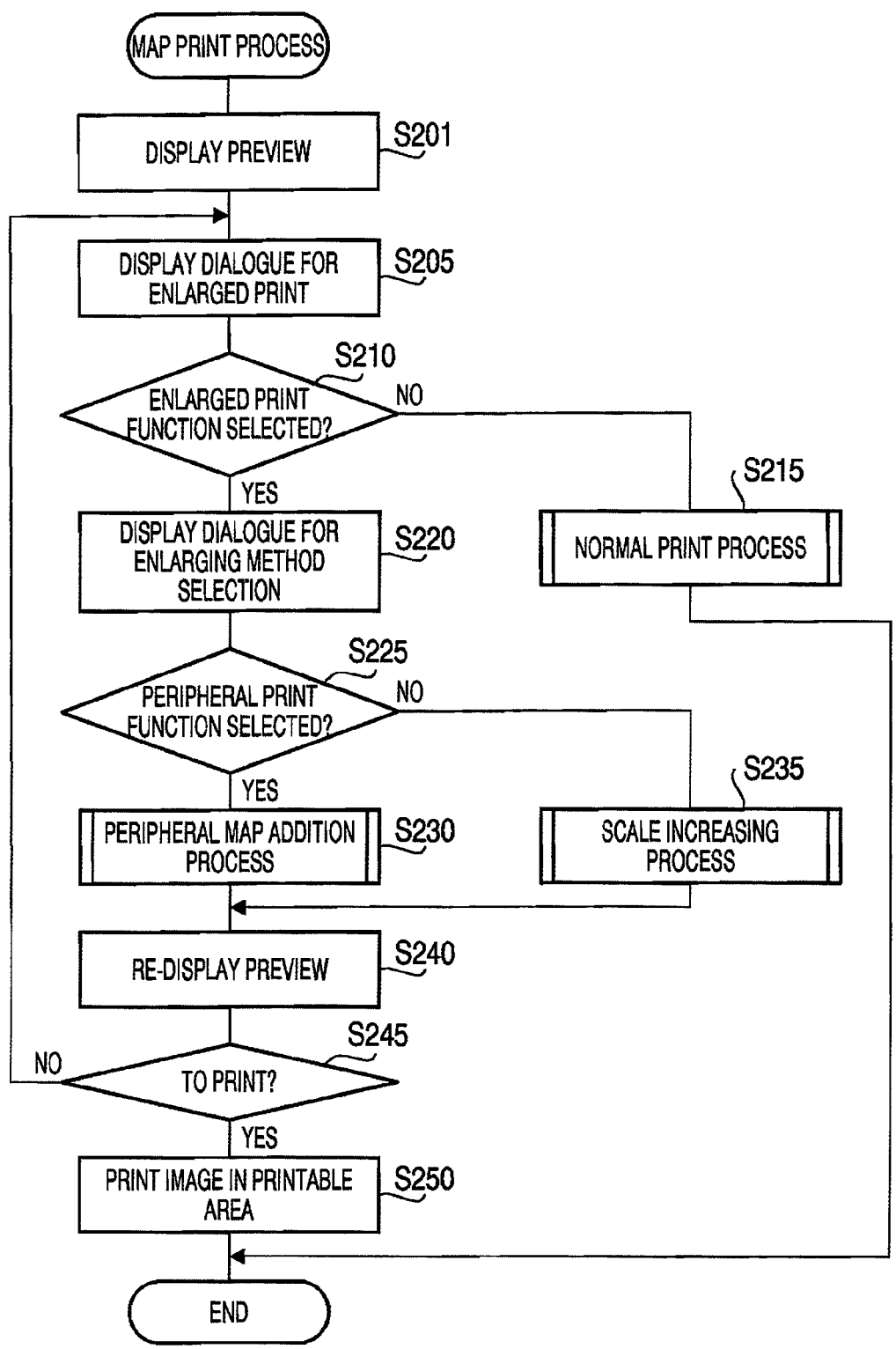
FIG. 3 is a flowchart illustrating a map print process.
Figure 4:
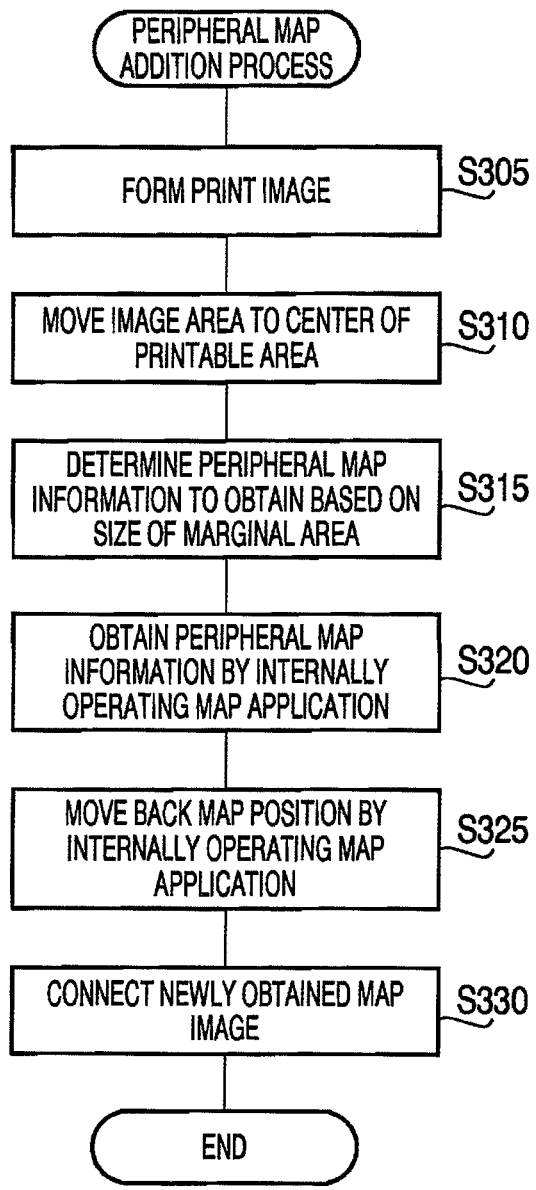
FIG. 4 is a flowchart illustrating a peripheral map addition process.
Figure 5:
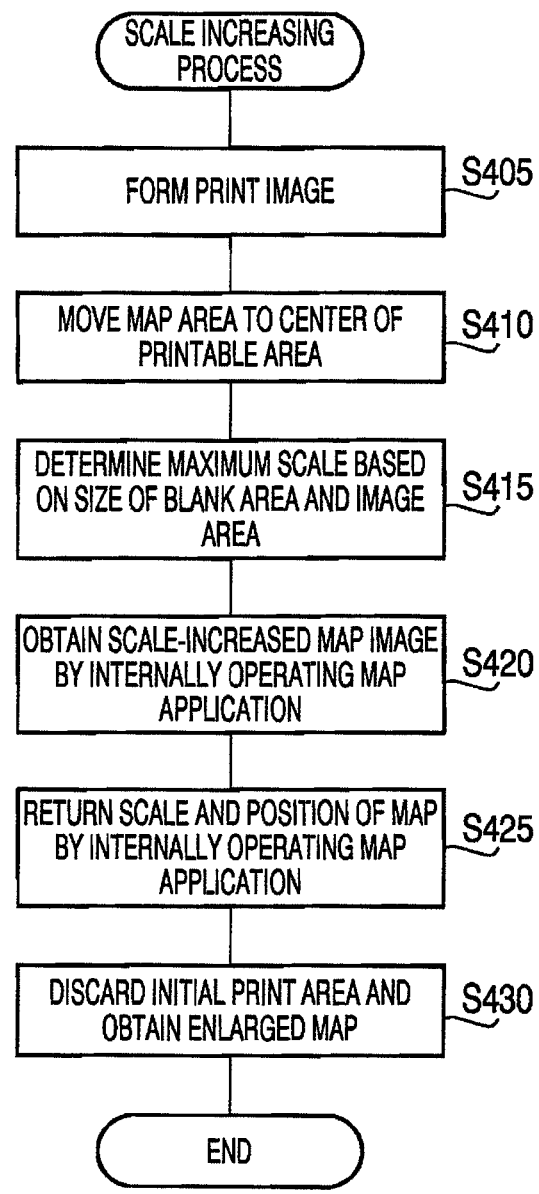
FIG. 5 is a flowchart illustrating a scale increasing process.

Among the processes which will be described hereafter, a process shown in FIG. 2 is a part of the standard function which is realized by the web browser, and the process shown in FIG. 2 is executed by the PC 1 when the map application is evoked through the web browser. Processes shown FIGS. 3-5 are part of extended functions realized by the plug-ins implemented to the web browser, and the processes (shown in FIGS. 3-5) are internally evoked. The processes are performed as programs corresponding to the processes are executed by the CPU 11.

When the process shown in FIG. 2 is evoked, the PC 1 is in a state of acquiring a user input (S105), and when a user input is made, the control proceeds to S110.

Then, the control judges whether the acquired user input is an operation to change a display area of the map or an operation to change the scale of the map (S110). If the user operation is to change the display area or the scale of the map (S110: YES), the control transmits data corresponding to the user input to the web server 7 (S115). Then, the control receives the data transmitted from the web server 7 (S120), changes the display area or the scale of the map in accordance with the received data (S125), and returns to S105 to wait for a further input by the user.

Examples of operations to change the display area or the scale of the map are a drag operation to drag the map and move in north, south, east and west direction, a click operation to click controls, click of which is treated as an operation similar to the drag operation, arranged on the display, a wheel operation to change the scale of the map, and a click operation to click controls, click of which is treated as an operation similar to the wheel operation, arranged on the display.

Then, data representing the user operation is transmitted from PC 1 to the web server 7 (S115), and, in response, the image data necessary for displaying the map is transmitted from the web server 7 to the PC 1. The PC 1 receives the image data transmitted from the web server (S120), and updates the displayed contents of the map dynamically (S120). As a result, in response to the user operation, the map is scrolled and/or the scale of the map is changed.

If the user operation is not the change of the display area (S110: NO), the control judges whether the user operation is to input the print command (S130). If the user operation is to input the print command (S130: YES), the control executes a printing operation to print the map (S140). Specifically, the process executed in S140 is to call a plug-in, which will be described later in detail. After execution of S140, the control returns to S105.

If the user operation is not the input of the print command (S130: NO), the control judges whether the user operation is to terminate the process (S145). If the user operation is not to terminate the process (S145: NO), the control executes a process according to the user input (S150), and returns to S105. Examples of the process executed in S145 will be omitted for brevity. If the user operation is to terminate the process (S145: YES), the control terminates the process.

Next, a map printing process which is performed based on the plug-in called in S140 will be described with reference to FIGS. 3-5.

When the map printing process is evoked, the control executes a preview display enabling the user to check what image will be printed if the web page subjected to be printed is actually printed (S201).

Figure 6A:
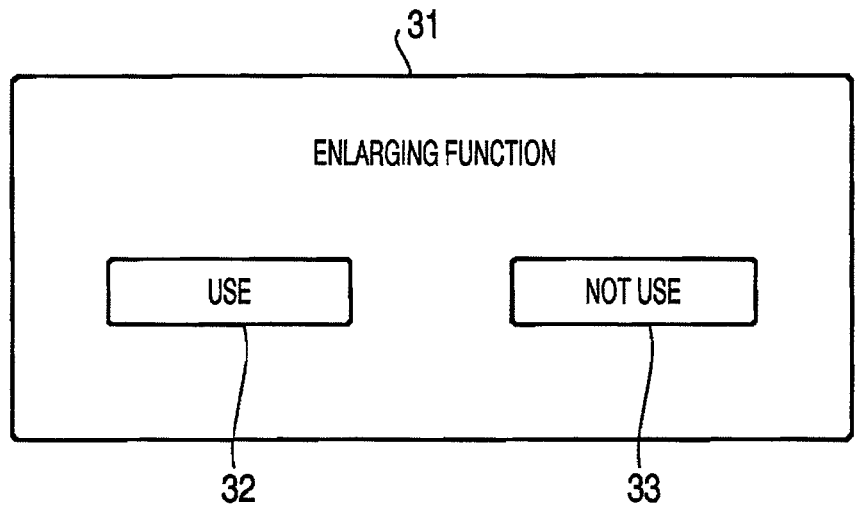
FIG. 6A shows a dialogue allowing a user to select whether the enlarging function is used.

Then, the control displays a dialogue requesting the user to select whether the enlarging print function is used or not (S205). In S205, a dialogue 31 (see FIG. 6A) is displayed on the display unit 16. As shown in FIG. 6A, the dialogue 31 contains a "USE" button 32 and a "NOT USE" button 33. When one of the "USE" button 32 and the "NOT USE" button 33 is selected by the user, the control proceeds to S210.

Next, the control judges whether the user operates the "USE" button 32 (S210). If the user selects the "NOT USE" button 33 (S210: NO), the control executes a normal printing operation (S215).

The printing operation at S215 is an operation to print the web page currently displayed by the web browser as it is. If map and/or other information is included in the web page, they are also printed out as they are. Further, if the image of the map is smaller than a printable area and margins are formed around the map, the map is printed out with remaining the margins as they are. The printing operation at S215 is thus similar to a printing operation executed by generally known web browsers. After execution of S215, the control terminates the process shown in FIG. 3.

Figure 6B:
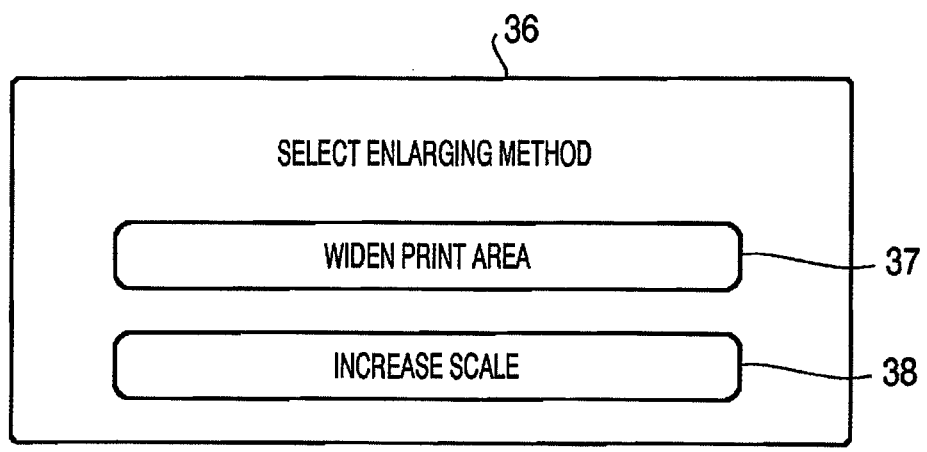
FIG. 6B shows a dialogue allowing a user to select an enlarging method to be used.

If the control judges that "USE" is selected (S210: YES), the control displays a dialogue allowing the user to select a method of enlargement (S220). Specifically, in S220, a dialogue 36 as shown in FIG. 6B is displayed on the display unit 16. In this dialogue 36, a button 37 of "WIDEN PRINT AREA" for printing the map with enlarging printing area to peripheral area and a button 38 of "INCREASE SCALE" for printing with increasing scale of the map are indicated. When the user operates to select the button 37 or 38, the control proceeds to S225.

Next, the control judges whether the button 37 of "WIDEN PRINT AREA" is selected (S225). If the control judges that the button 37 is selected (S225: YES), the control executes the "PERIPHERAL MAP ADDITION PROCESS" (S230), which is illustrated in detail in FIG. 4.

When the "PERIPHERAL MAP ADDITION PROCESS" is started, the control generates a pint image of the map (S305). When the print image is generated, an image developing area 51 is reserved in the RAM 13. It should be noted that the number of pixels of the print image is determined based on the size of the printing medium (e.g., a sheet), a resolution of the image and the like.

Then, a map image 55, which is a print image based on the map image data included in the web page data, is developed at a predetermined position within a printable area 53, which is determined by the margin settings etc. within the image developing area 53.

The web page data may include image data other than the map image data and text data. Such data other than the map image data is not used for generating the print image data in S305. That is, the area other than the area where the map image 55 is developed is remained as a blank area (i.e., an area where no image is developed).

Next, the control moves the map image 55 to the center of the printable area 53 (S310). That is, in S310, the control moves the map image 55 so that the center of the map image coincides with the center of the printable area 53 based on the size of the printable area 53 and the size of the map image 55. For example, the map image 55 of which position is shown in FIG. 7A is moved to the central position as shown in FIG. 7B.

Then, the control determines the map information of the peripheral area (area around the map image 55) to be obtained based on the size of the blank area around the map image 55 (S315). In other words, the control determines the area of the map to fill in the blank area around the map image 55 and within the printable area 53.

Next, the control internally operates the map application and obtains the map information of the peripheral area around the map image 55 (S320). Specifically, the control obtains the image around the map image 55 from the web server with use of a script process to internally emulate the user operation to the map application.

For example, by internally executing (emulating), with use of the script process, a drag operation to move the display area of the map to north, south, east or west and/or a click operation of the controls arranged on the screen are emulated, and the control transmits data representing such a user operation to the web server 7, and obtains the image around the map image 55, which is transmitted from the web server 7.

The scripts for emulating various user operations are stored as files together with the plug-in main program on the HDD 14 when the plug-ins are installed. Therefore, in S320, the control retrieves files corresponding to the necessary user operations and executes the emulations of the user operations based on the scripts contained in the retrieved files.

Thereafter, the control internally operates the map application to move back the map image 55 to its original position (S325) and connects images of the map information newly obtained in S320 to the map image 55 (S330).

As a result, the map image 55 which includes the map image 55 and the map images around the map image 55 is developed in the image developing area 51 as shown in FIG. 7C. When the map image 57 is developed, the control terminates the process shown in FIG. 4 and proceeds to S240 of FIG. 3.

If the control judges that the process of "PERIPHERAL PRINT FUNCTION" is not selected (S225: NO), the process executes the process of "SCALE INCREASING PROCESS" (S235), which is illustrated in FIG. 5. Specifically, the control firstly generates a print image of the map (S405). The step S405 is similar to the step S305 and the map image 55 is developed within the printable area 53 as shown in FIG. 7A.

Next, the control moves the image area of the map image 55 to the center of the printable area 53 (S410), which is similar to the control in S310. As a result, the map image 55 is moved from the position shown in FIG. 7A to the position shown in FIG. 7B.

Then, the control compares the size of the blank area around the map image 55 and the size of the map image 55 to determine the possible scale for enlarging the map (S415). Specifically, in S415, the control determines the maximum scale at which the geographic area of the map image 55 can be shown in the printable area 53.

The scale of the map image provided from the web server 7 can be switched stepwise based on the user operation, and the switchable scales area stored in the PC 1 in advance. Thus, in S415, the control calculates sizes of map images showing the geographic area of the map image 55 for the switchable scales, respectively, and then compares the thus calculated sizes with the printable area 53 to determine the maximum scale to be applied.

Then, the control internally operates the map application and obtains the map information of the increased scale (maximum scale) for the geographic area of the map image 55 (S420). Specifically, in S420, the control internally emulates the user operation by the script process, similarly to S320, and obtains the map image of the scale determined in S415 from the web server 7.

For example, with use of script processes to internally execute a wheel rotating operation to change the scale of the map or a clicking of the controls arranged on the screen, the control transmits data representing such user operations to the web server 7, and obtains the images transmitted from the web server 7 by return.

Then, the control internally operates the map application to move the map image to its original position (S420), discards the original print area, and pates the newly obtained map of which the scale is increased (S430). As a result, as shown in FIG. 7D, a map image 59 of which the geographic area is the same as that of the map image 55, and the scale is increased is developed within the image developing area 51.

The map image 59 contains more detailed information than the map image 55 since the scale is increased, although the geographic area of the map image 59 is the same as that of the map image 55. Thus, in the map image 59 shown in FIG. 7D, narrower alleys are shown. It should be noted that, if the map image 55 has been merely enlarged, such a map does not show more detailed information than the map image 55, although the map images 55 and 59 are homothetic. After the map image 59 has been developed, the control terminates the process shown in FIG. 5, and the control returns to S240 (FIG. 3).

After the control has executed S230 or S235, the control re-display the preview image (S240). In S230 or S240, a new map image (map image 57 or 59) is developed in the image developing area 51, the control displays the preview image again so that the user can check the updated image which is to be printed on the display unit 16.

Next, in response to the user operation, the control judges whether the user operation is to instruct a printing operation or not (S245). If the user operation is to instruct printing (S245: YES), the control calls a printer driver and controls the printer 3 to print the image in the printable area 53 (S250). Thereafter, the control terminates the process shown in FIG. 3. At this stage, the process called in S140 of FIG. 2 has been finished.

If the user operation is not to instruct printing (S245: NO), the control returns to S205. Then, the user restarts selection of the enlarging function or not (S205-).

According to the exemplary embodiment described above, the blank area, which is not used if only the map image 55 is generated, is used (i.e., the map image 57 or 59 is generated). That is, an area on the printing sheet when the image is printed with the printer 3 can be used for printing the map image 57 or 59.

The map image 57 shows a wider geographic area than the map image 55. Therefore, the user can obtain information of the geographically wider area. The map image 59 shows a map image at a larger scale than the map image 55. Therefore, the user can obtain more detailed information.

According to the embodiment, in S220-S225, the user can optionally select whether the map image 57 having a wider geographical area than the map image 55 or the map image 59 showing a larger scale map image than the map image 55. Thus, the exemplary embodiment can well meet the needs of the user.

It should be noted that the invention needs not be limited to the configuration of the above-described exemplary embodiment. Rather, the invention can be modified in various ways without departing from the scope of the invention.

For example, in S305 (FIG. 4) or S405 (FIG. 5), image data other than the map image and text data are not included when a print image is generated. This configuration may be modified such that the areas of such data are treated as blank areas.

If the control cannot distinguish the map image data from the image data included in the web page data, it is possible to generate a print image based on the image data included in the web page data, and then identify an image having characteristics of a map image as the map image 55.

It may be possible to store positional information representing a position of the map within a web page, and identify the image that is to be located at the position where the map is located as the map image 55.

According to the exemplary embodiment, the map image 55 is moved to the central portion of the printable area 53 in S310 (FIG. 4) or S410 (FIG. 5). The map image 55 may not be moved precisely at the center of the printable area 53 but may be roughly moved to a central area with some allowance. If the map image 55 is located at a central area of the printable area 53 and is not necessary to move, step S310 or S410 may be skipped.

According to the exemplary embodiment, the user is allowed to alternatively select, as a method of enlarging the map image, addition of maps of neighboring areas or increase of the scale. This configuration may be modified such that the user may optionally be allowed to select both (i.e., addition of maps of neighboring areas or increase of the scale) at a time. In such a case, steps S410-S430 (FIG. 5) are executed, and subsequently, steps S315-S330 (FIG. 4) are executed instead of executing S230 or S235.

In the exemplary embodiment, the dialogues 31 and 36 are displayed (S205, S220). Displaying of such a dialogue may be replaced with other means.

As alternatives to the dialogues 31 and 36, a setting file may be used. That is, user may be required to select usage of the enlarging function and method of enlargement in a setting window in advance, and the selection is stored as the setting file. By retrieving the setting file and obtaining the settings therein, printing can be done without displaying the setting dialogues 31 and 36.

In the exemplary embodiment, the scale of the map changes stepwise. Whether the scale changes stepwise or continuously may depend on a provider of the map data. Further, when the scale changes stepwise, available steps may depend on the provider of the map data.

Therefore, it may be advantageous that information regarding the providers of the map data is stored in the PC 1, and when the scale is changed, the control may refer to the information and changes the scale in a manner corresponding to the provider.

In the exemplary embodiment, the PC 1 obtains the map images around the map image 55 and/or map images of changed scales from the web server 7 by emulating the user operation to the map application with use of scripts. Such a configuration may be modified.

For example, by incorporating information (longitude, attitude, scale, etc.) in a URL (Uniform Resource Locator) when the PC 1 accesses the web server 7, information necessary for obtaining the map image is transmitted to the web server, and the PC 1 can obtain the necessary map images.

It should be noted that a method of obtaining the images may depend on client-directed interfaces employed in the web server 7. It is advantageous if information regarding such a client-oriented interface for each provider of the map data is stored in advance, map images can be obtained in accordance with methods appropriate to the providers, respectively.

When the user operations are emulated with user of the scripts, it is preferable that what user operations are acceptable in each provider, and such information may be stored in the PC 1. Alternatively, whether a user operation is accepted by a web server by actually executing a script.

For example, when a scroll of the map is to be executed, a try run of a script for a drag operation is executed. Then, whether the map is scrolled or not is determined by judging whether the map image has been changed after the try run. Specifically, if map images before and after the try run of a script are compared, and if an image located at an upper portion of the map image before the try run remains at a lower portion of the map image after the try run, and another image at the lower portion of the map image before the try run has extinguished in the map image after the try run, it can be judged that the area of the map has moved northward as a result of the scroll (i.e., the script).

If no change is found in the map image before and after the try run, the try run of other scripts emulating, for example, a button operation and the like may be done in a predetermined order until the scroll of the map is performed.

It is also possible to execute a try run when the scale of the map is changed. When changing the scale, a try run of a script emulating the wheel operation (rotation) is executed, and whether the map image has been changed after the tray run is judged to determine whether the scale has been changed. To judge the change of the scale, for example, main roads and railways are extracted as lines from the images before and after the try run, and judges whether there are similar patterns (having different sizes) formed by the extracted lines in the images before and after the try run.

In the exemplary embodiment, the map is moved to the initial position by internally operates the map application (S325 and S425). This may be modified such that a URL is stored when the map is located at the initial position, and by re-accessing the URL later, the map can be moved to the initial position.

In the exemplary embodiment, the printer 3 is described as an example of an image formation device. It should be noted that the present invention is also applicable to image formation device other than the printer. That is, an image formation device capable of forming images onto an electronic paper that realizes a printing medium electronically with use of a displaying device, or a virtual printing medium handled in a PC (e.g., a PDF file).

In the exemplary embodiment, the PC 1 and the printer 3 are separate devices. However, the invention should not be limited to such a configuration. For example, if an integrated device having a function of the printer 3 is provided with a user interface as is implemented in the PC 1 of the exemplary embodiment, a CPU of the integrated device may execute the programs corresponding to the browser and plug-ins of the exemplary embodiment. In such a case the CPU of the integrated device controls its printing function to print the image of the printable area 53 (cf. S250).

According to the exemplary embodiment, functions of processing the image data are realized by incorporating programs as plug-ins. However, the invention needs not be limited to such a configuration. The browser may have such functions. Alternatively, the browser may be configured to call the printer driver or application instead of S140 (FIG. 2), and the called printer driver or application may execute the image processing. If the printer driver is configured to execute the above process, in S250, the printer driver may control the printer 3 to print the image of the printable area 53. If the application is configured to execute the above process, the printer driver is called in S250 and the image in the printable area 53 is printed by the printer 3.

In the exemplary embodiment, the map image data is provided by a web server. However, the invention needs not be limited to such a configuration, and the map image data may be provided by another provider. For example, the configuration of the exemplary embodiment may be modified so that the map image data is retrieved from a storage, or the map image data may be obtained from another PC.

What is claimed:

1. A non-transitory recording medium storing an image processing program including instructions to be executed by a computer, the computer being connected with an image formation device configured to output image on a recording medium, the instructions causing the computer to function as an image processing device which comprises:
    a data obtaining unit configured to obtain map image data from a map image data provider, the map image data representing a basic map image showing a geographic area;
    an area identifying unit configured to identify a basic image formation area and a surplus area, the basic image formation area and the surplus area being an area within an image forming area on the recording medium, the basic map image being formed on the basic image formation area, the surplus area being an area within the image forming area but the basic map image is not formed;
    an additional data obtaining unit configured to obtain map image data necessary for covering an enlarged image formation area, which is an area including the basic image formation area and at least part of the surplus area, from the map image data provider; and
    a controlling unit configured to control the image formation device to output the enlarged map image on the recording medium based on the map image data additionally obtained from the map image data provider,
    wherein the map image data for covering the enlarged image formation area represents a map image at a larger scale than the basic map image.

2. The recording medium according to claim 1, wherein the map image data necessary for covering the enlarged image formation area represents geographically wider area than the geographic area represented by the basic map image.

3. The recording medium according to claim 1, wherein the image processing device further includes an input unit allowing a user to select one of an enlarged geographic area and an enlarged scale when the map image is to be enlarged.

4. The recording medium according to claim 3, wherein the additional data obtaining unit obtains, from the map image data provider, the map image data representing geographically wider area than the geographic area represented by the basic map image when the user selected the enlarged geographic area.

5. The recording medium according to claim 3, wherein the additional data obtaining unit obtains, from the map image data provider, the map image data representing a map image at a larger scale than the basic map image.

6. The recording medium according to claim 1, wherein the image processing device further includes an input unit allowing a user to select one of an enlarged map image and the basic map image to be formed.

7. The recording medium according to claim 6, wherein the controlling unit controls the image formation device to form the enlarged map image on the recording medium if the user selects the enlarged map image, while the controlling unit controls the image formation device to form the basic map image if the user selects the basic map image.

8. An image processing device connected with an image formation device configured to output image on a recording medium, comprising:
    a data obtaining unit configured to obtain map image data from a map image data provider, the map image data representing a basic map image showing a geographic area;
    an area identifying unit configured to identify a basic image formation area and a surplus area, the basic image formation area and the surplus area being an area within an image forming area on the recording medium, the basic map image being formed on the basic image formation area, the surplus area being an area within the image forming area but the basic map image is not formed;
    an additional data obtaining unit configured to obtain map image data necessary for covering an enlarged image formation area, which is an area including the basic image formation area and at least part of the surplus area, from the map image data provider; and
    a controlling unit configured to control the image formation device to output the enlarged map image on the recording medium based on the map image data additionally obtained from the map image data provider,
    wherein the map image data for covering the enlarged image formation area represents a map image at a larger scale than the basic map image.

9. The image processing device according to claim 8, wherein the map image data necessary for covering the enlarged image formation area represents geographically wider area than the geographic area represented by the basic map image.

10. The image processing device according to claim 8, further comprising an input unit allowing a user to select one of an enlarged geographic area and an enlarged scale when the map image is to be enlarged.

11. The image processing device according to claim 10, wherein the additional data obtaining unit obtains, from the map image data provider, the map image data representing geographically wider area than the geographic area represented by the basic map image when the user selected the enlarged geographic area.

12. The image processing device according to claim 10, wherein the additional data obtaining unit obtains, from the map image data provider, the map image data representing a map image at a larger scale than the basic map image.

13. The image processing device according to claim 8, further comprising an input unit allowing a user to select one of an enlarged map image and the basic map image to be formed.

14. The image processing device according to claim 13, wherein the controlling unit controls the image formation device to form the enlarged map image on the recording medium if the user selects the enlarged map image, while the controlling unit controls the image formation device to form the basic map image if the user selects the basic map image.

15. An image processing method for a computer which is connected with an image formation device configured to output image on a recording medium, the method comprising:
obtaining map image data from a map image data provider, the map image data representing a basic map image showing a geographic area;
identifying a basic image formation area and a surplus area, the basic image formation area and the surplus area being an area within an image forming area on the recording medium, the basic map image being formed on the basic image formation area, the surplus area being an area within the image forming area but the basic map image is not formed;
obtaining additional map image data necessary for covering an enlarged image formation area, which is an area including the basic image formation area and at least part of the surplus area, from the map image data provider; and
controlling the image formation device to output the enlarged map image on the recording medium based on the map image data additionally obtained from the map image data provider,
wherein the map image data for covering the enlarged image formation area represents a map image at a larger scale than the basic map image.

16. The image processing method according to claim 15, wherein the map image data necessary for covering the enlarged image formation area represents geographically wider area than the geographic area represented by the basic map image.

17. The image processing method according to claim 15, further including a step of allowing a user to select one of an enlarged geographic area and an enlarged scale when the map image is to be enlarged.

18. The image processing method according to claim 17, wherein the step of obtaining additional map data obtains, from the map image data provider, the map image data representing geographically wider area than the geographic area represented by the basic map image when the user selected the enlarged geographic area.

19. The image processing method according to claim 17, wherein the step of obtaining additional map data obtains, from the map image data provider, the map image data representing a map image at a larger scale than the basic map image.

20. The image processing method according to claim 15, further including a step of allowing a user to select one of an enlarged map image and the basic map image to be formed.

21. The image processing method according to claim 20, wherein the step of controls the image formation device to form the enlarged map image on the recording medium if the user selects the enlarged map image, while the step of controlling controls the image formation device to form the basic map image if the user selects the basic map image.

22. A non-transitory recording medium storing an image processing program including instructions to be executed by a computer, the computer being connected with an image formation device configured to output image on a recording medium, the instructions causing the computer to function as an image processing device which comprises:
a data obtaining unit configured to obtain map image data from a map image data provider, the map image data representing a basic map image showing a geographic area;
an area identifying unit configured to identify a basic image formation area and a surplus area, the basic image formation area and the surplus area being an area within an image forming area on the recording medium, the basic map image being formed on the basic image formation area, the surplus area being an area within the image forming area but the basic map image is not formed;
an additional data obtaining unit configured to obtain map image data necessary for covering an enlarged image formation area, which is an area including the basic image formation area and at least part of the surplus area, from the map image data provider;
a controlling unit configured to control the image formation device to output the enlarged map image on the recording medium based on the map image data additionally obtained from the map image data provider; and
an input unit allowing selection of one of an enlarged geographic area and an enlarged scale when the map image is to be enlarged.

23. The recording medium according to claim 22, wherein the map image data necessary for covering the enlarged image formation area represents geographically wider area than the geographic area represented by the basic map image.

24. The recording medium according to claim 22, wherein the additional data obtaining unit obtains, from the map image data provider, the map image data representing geographically wider area than the geographic area represented by the basic map image when the user selected the enlarged geographic area.

25. The recording medium according to claim 22, wherein the additional data obtaining unit obtains, from the map image data provider, the map image data representing a map image at a larger scale than the basic map image.

26. The recording medium according to claim 22, wherein the image processing device further includes an input unit allowing a user to select one of an enlarged map image and the basic map image to be formed.

27. The recording medium according to claim 26, wherein the controlling unit controls the image formation device to form the enlarged map image on the recording medium if the user selects the enlarged map image, while the controlling unit controls the image formation device to form the basic map image if the user selects the basic map image.

28. An image processing device connected with an image formation device configured to output image on a recording medium, comprising:
- a data obtaining unit configured to obtain map image data from a map image data provider, the map image data representing a basic map image showing a geographic area;
- an area identifying unit configured to identify a basic image formation area and a surplus area, the basic image formation area and the surplus area being an area within an image forming area on the recording medium, the basic map image being formed on the basic image formation area, the surplus area being an area within the image forming area but the basic map image is not formed;
- an additional data obtaining unit configured to obtain map image data necessary for covering an enlarged image formation area, which is an area including the basic image formation area and at least part of the surplus area, from the map image data provider;
- a controlling unit configured to control the image formation device to output the enlarged map image on the recording medium based on the map image data additionally obtained from the map image data provider; and
- an input unit allowing selection of one of an enlarged geographic area and an enlarged scale when the map image is to be enlarged.

29. The image processing device according to claim 28, wherein the map image data necessary for covering the enlarged image formation area represents geographically wider area than the geographic area represented by the basic map image.

30. The image processing device according to claim 28, wherein the additional data obtaining unit obtains, from the map image data provider, the map image data representing geographically wider area than the geographic area represented by the basic map image when the user selected the enlarged geographic area.

31. The image processing device according to claim 28, wherein the additional data obtaining unit obtains, from the map image data provider, the map image data representing a map image at a larger scale than the basic map image.

32. The image processing device according to claim 28, further comprising an input unit allowing a user to select one of an enlarged map image and the basic map image to be formed.

33. The image processing device according to claim 32, wherein the controlling unit controls the image formation device to form the enlarged map image on the recording medium if the user selects the enlarged map image, while the controlling unit controls the image formation device to form the basic map image if the user selects the basic map image.

34. An image processing method for a computer which is connected with an image formation device configured to output image on a recording medium, the method comprising:
- obtaining map image data from a map image data provider, the map image data representing a basic map image showing a geographic area;
- identifying a basic image formation area and a surplus area, the basic image formation area and the surplus area being an area within an image forming area on the recording medium, the basic map image being formed on the basic image formation area, the surplus area being an area within the image forming area but the basic map image is not formed;
- obtaining additional map image data necessary for covering an enlarged image formation area, which is an area including the basic image formation area and at least part of the surplus area, from the map image data provider;
- controlling the image formation device to output the enlarged map image on the recording medium based on the map image data additionally obtained from the map image data provider; and
- receiving selection of one of an enlarged geographic area and an enlarged scale when the map image is to be enlarged.

35. The image processing method according to claim 34, wherein the map image data necessary for covering the enlarged image formation area represents geographically wider area than the geographic area represented by the basic map image.

36. The image processing method according to claim 34 wherein the step of obtaining additional map data obtains, from the map image data provider, the map image data representing geographically wider area than the geographic area represented by the basic map image when the user selected the enlarged geographic area.

37. The image processing method according to claim 34, wherein the step of obtaining additional map data obtains, from the map image data provider, the map image data representing a map image at a larger scale than the basic map image.

38. The image processing method according to claim 34, further including a step of allowing a user to select one of an enlarged map image and the basic map image to be formed.

39. The image processing method according to claim 38, wherein the step of controls the image formation device to form the enlarged map image on the recording medium if the user selects the enlarged map image, while the step of controlling controls the image formation device to form the basic map image if the user selects the basic map image.

* * * * *